US012692981B2

(12) United States Patent
Tarnowski

(10) Patent No.: US 12,692,981 B2
(45) Date of Patent: Jul. 28, 2026

(54) FIBRE-REINFORCED PRESSURE VESSEL

(71) Applicant: NPROXX B.V., Heerlen (NL)

(72) Inventor: Benjamin Tarnowski, Aachen (DE)

(73) Assignee: NPROXX B.V., Heerlen (NL)

( * ) Notice: Subject to any disclaimer, the term of this patent is extended or adjusted under 35 U.S.C. 154(b) by 222 days.

(21) Appl. No.: 17/638,284

(22) PCT Filed: Aug. 26, 2020

(86) PCT No.: PCT/EP2020/073846
§ 371 (c)(1),
(2) Date: Feb. 25, 2022

(87) PCT Pub. No.: WO2021/037908
PCT Pub. Date: Mar. 4, 2021

(65) Prior Publication Data

US 2022/0299160 A1 Sep. 22, 2022

(30) Foreign Application Priority Data

Aug. 30, 2019 (EP) .................................... 19194606

(51) Int. Cl.
*F17C 1/06* (2006.01)

(52) U.S. Cl.
CPC ........ *F17C 1/06* (2013.01); *F17C 2201/0109* (2013.01); *F17C 2203/0604* (2013.01);
(Continued)

(58) Field of Classification Search
CPC ................ F17C 1/06; F17C 2201/0109; F17C 2203/0604; F17C 2203/0609;
(Continued)

(56) References Cited

U.S. PATENT DOCUMENTS 5,918,759 A * 7/1999 Beckmann ........... B65D 90/029
220/62.19
2004/0173618 A1* 9/2004 Suzuki ...................... F17C 1/16
220/581

(Continued)

FOREIGN PATENT DOCUMENTS

CN 109282139 1/2019
CN 109282139 A 1/2019

(Continued)

OTHER PUBLICATIONS

English Machine Translation of DE-102017220882-A1 (Year: 2019).*

(Continued)

*Primary Examiner* — Laura E. Parker
(74) *Attorney, Agent, or Firm* — Tarollim Sundheim, Covell & Tummino LLP

(57) ABSTRACT

The invention relates to a fiber-reinforced pressure vessel (1) and to a method (100) of manufacturing the same, having an inner vessel (2) made of a thermoplastic material for receiving a filling medium, with an outer face and a fiber composite layer (3) arranged around the outer face for providing pressure resistance of the pressure vessel and at least one valve connection (4) connected to the inner vessel and the fiber composite layer; a thermoplastic band (5) being applied additionally at least on a portion of the outer face of the inner vessel, the thermoplastic band having a thermal expansion coefficient which is small enough to keep any gap (6) which may be created by thermal shrinkage between the fiber composite layer and the inner vessel by its thermal expansion coefficient smaller than would be the case without the presence of the thermoplastic band.

6 Claims, 3 Drawing Sheets

Figure 1:
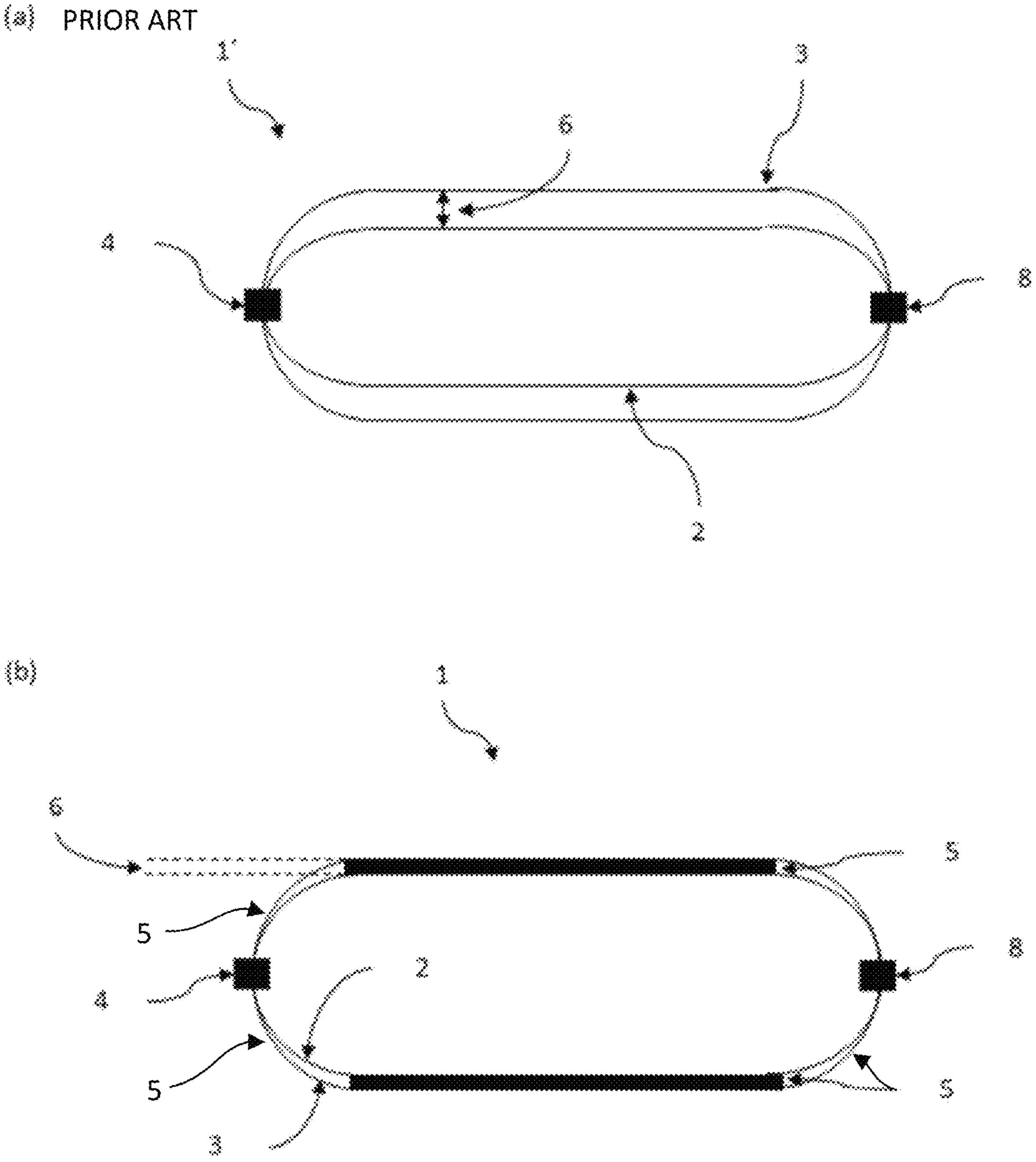

(52) U.S. Cl.
CPC ................. *F17C 2203/0609* (2013.01); *F17C 2203/066* (2013.01); *F17C 2203/0663* (2013.01); *F17C 2205/0305* (2013.01); *F17C 2209/221* (2013.01)

(58) Field of Classification Search
CPC ........ F17C 2203/066; F17C 2203/0663; F17C 2205/0305; F17C 2209/221; F17C 2209/2154; F17C 2209/232
USPC .......................................................... 220/588
See application file for complete search history.

(56) References Cited

U.S. PATENT DOCUMENTS

| | | | | |
|---|---|---|---|---|
| 2010/0276434 | A1* | 11/2010 | Berger | F17C 1/16 427/372.2 |
| 2020/0158286 | A1* | 5/2020 | Criel | F17C 1/00 |
| 2020/0224823 | A1* | 7/2020 | Hatta | B29C 63/08 |

FOREIGN PATENT DOCUMENTS

| | | | | |
|---|---|---|---|---|
| DE | 102017220882 | A1 * | 5/2019 | |
| EP | 2668020 | A1 | 12/2013 | |
| EP | 3267091 | A1 * | 1/2018 | F17C 1/06 |
| JP | 2006 322590 | | 11/2006 | |
| JP | 2006/322590 | A | 11/2006 | |
| WO | 2019/007978 | A1 | 1/2019 | |
| WO | 2020002462 | A1 | 1/2020 | |
| WO | 2020/181047 | | 9/2020 | |
| WO | 2020181047 | A2 | 9/2020 | |

OTHER PUBLICATIONS

Kirkland, Tom, “Straight Talk About Laser Welding of Thermoplastics,” Jan. 1, 2004, retrieved from https://plasticsdecorating.com/articles/2004/straight-talk-about-laser-welding-of-thermoplastics/ (Year: 2004).*

International Preliminary Report on Patentability issued in connection with PCT Application No. PCT/EP2020/073846 dated Jun. 29, 2021.

International Search Report and Written Opinion for corresponding patent application No. PCT/EP2020/073846 dated Nov. 9, 2020.

EPO Form 2001 issued Dec. 1, 2022 for corresponding EP 19 194 606.0.

* cited by examiner

FIBRE-REINFORCED PRESSURE VESSEL

RELATED APPLICATIONS

The present invention is a U.S. National Stage under 35 USC 371 patent application, claiming priority to Serial No. PCT/EP2020/073846, filed on Aug. 26, 2020; which claims priority from European Patent Application No. 19194606.0 filed on Aug. 30, 2019; the entirety of both are hereby incorporated herein by reference.

TECHNICAL FIELD OF THE INVENTION

The invention relates to a fiber-reinforced pressure vessel and to a method of producing the same.

PRIOR ART

The market for pressure vessels which are reinforced with fiber composite material is continuously growing. The increasing production of natural gas and fracking gas, especially in countries without an appropriate pipeline network, is creating a demand for storage in pressure vessels. Added to this there is the automotive sector, which is working hard on developing fuel-cell vehicles, in which the fuel is to be stored in the form of gaseous hydrogen at high pressure in pressure vessels. Lightweight pressure vessels are desired for transporting the pressure vessels, because transporting pressure vessels of high weights consumes an unnecessarily large amount of energy and therefore causes excessively high transportation costs.

Currently employed cylindrical pressure vessels have a reinforcement layer consisting of fiber composite material with fibers embedded in a matrix material which is wound as an outer layer onto an inner vessel (called liner) of the pressure vessel, which acts as a winding core, by means of a winding method. Winding is the preferred process for a manufacturing of fiber composite layers which is efficient in terms of time and costs. While the inner vessel guarantees, for instance, gas-tightness of the pressure vessel, the reinforcement layer made of fiber composite material provides the pressure vessel with the necessary mechanical rigidity. For pressure vessels of type 3, a mechanical inner vessel (metallic liner) consisting e. g. of aluminum or steel is employed; in case of pressure vessels of type 4, the inner vessel (liner) is made of plastic. Especially in the case of pressure vessels of type 4, cold filling presents a great technological challenge for all vessel manufacturers, in particular if the vessel is completely unstressed. If the initial state amounts to 0 bar and the inner vessels are then subjected to pressure, the inner vessels may crack, especially at low temperatures where the inner vessel (liner) is brittle. At 0 bar, the liner typically does not adhere to the laminate; instead, there is a gap between the two components. The gap between the inner vessel and the fiber reinforcement around the inner vessel can be such that the inner vessel may possibly contact the fiber reinforcement merely at the boss. If subjected to pressure, the liner may move extensively and quickly within large ranges, which leads to what are called “cold filling problems” with failure of the liner.

The international patent application WO 2019/007978 A1 discloses a pressure vessel for storing a pressurized fluid, the pressure vessel comprising a thermoplastic lining with a cylindrical portion, a first rounded end portion and a second rounded end portion and a reinforcement structure made of a composite material, the reinforcement structure enclosing at least the cylindrical portion of the thermoplastic liner. The pressure vessel further has a local reinforcement layer.

The European patent application EP 3 267 091 discloses a pressure vessel comprising a body and a band-based reinforcement structure arranged on the body, the band-based reinforcement structure comprising a primary band arranged on the body in the circumferential direction and a secondary band arranged on the body in the circumferential direction, at least one portion of the secondary band being fastened to the primary band.

The European patent application EP 2 668 020 A1 discloses a method of improving the blocking properties of composite gas cylinders for storing gases, by wrapping a plastic film comprising a blocking material by means of a wrapping method around the outer face of a composite gas cylinder. The composite gas cylinder consists of an interior liner made of polyolefin and an exterior fiber-reinforced, pressure-bearing layer. The blocking material may comprise polyamide, polyester, halogen-substituted polymer, EVOH or a metal plating. The document also discloses a high-pressure composite gas cylinder with improved blocking properties and the use thereof as a fuel tank in gas-powered motor vehicles equipped with an internal combustion engine.

Thus, there is a demand for pressure vessels which can be reliably filled multiple times even at low temperatures, particularly in a no-stress state of the vessel, without undergoing any damage.

SUMMARY OF THE INVENTION

The object of the invention is to provide a pressure vessel which can be reliably filled multiple times even at low temperatures, particularly at a no-stress state of the vessel, without cracking.

This object is achieved by a fiber-reinforced pressure vessel having an inner vessel made of a thermoplastic material for receiving a filling medium with an outer face and a fiber composite layer arranged around the outer face for providing pressure resistance of the pressure vessel and at least one valve connection connected to the inner vessel and to the fiber composite layer, a thermoplastic band being additionally applied at least on portions of the outer face of the inner vessel, the thermoplastic band being a polyamide or polyethylene band and/or comprising a fiber reinforcement, preferably a carbon fiber-containing fiber reinforcement. Polyamide or polyethylene are particularly well-suited thermoplastic materials. Polyamides have excellent strength and toughness. Polyethylene is a widely distributed thermoplastic material the properties of which are well-known. The fiber reinforcement makes it possible to use the same material as matrix material of the thermoplastic band which is also the material of the inner vessel and at the same time to generate a lower thermal expansion coefficient for the thermoplastic band since this coefficient is determined by the properties of the fiber reinforcement. Thus, a fiber-reinforced thermoplastic band remains easy to weld and in addition protects the inner vessel very well from failure during pressure filling. A carbon fiber-containing fiber reinforcement has proven to be particularly suitable due to the thermal expansion coefficient of carbon fiber. Thus, the thermoplastic band has a thermal expansion coefficient small enough to keep any gap between fiber composite layer and inner vessel, which may be caused by thermal shrinkage, smaller than would be the case without presence of the thermoplastic band.

The term "pressure vessel" comprises all types and shapes of pressure vessels which comprise an inner vessel made of a thermoplastic material and have been mechanically reinforced by a fiber composite material on the outside such that the pressure vessel meets the requirements made in terms of pressure resistance. As a rule, these pressure vessels are cylindrical with convex terminals on both sides of the cylindrical central part. These terminals are called pole caps and are used for pressure-tight sealing of the central part. For reinforcement of the pressure vessel, an outer layer made of fiber composite material is wound around the outside of the inner vessel, potentially forming at the same time the outer face of the pressure vessel. The inner vessel can be produced by means of various techniques, for instance by welding, injection molding or as a blow-molded part. The pole caps can also be placed onto the central part after production, for instance by welding. The separate pole caps may be manufactured, for instance, by injection molding. Pressure vessels with a thermoplastic inner vessel have a very low weight, on the one hand, which is important e. g. for applications in means of transport; and on the other hand, content such as hydrogen, for example, can be stored under high pressure with low losses since suitable thermoplasts have a sufficiently low hydrogen permeability and the required rigidity is provided by the outer layer made of fiber composite material.

In general, a fiber composite material for the fiber composite layer is composed of two main components, which are fibers herein, embedded in a matrix material which creates the strong bond between the fibers. Therein, the fiber composite material can be wound from one fiber or from a plurality of fibers, wherein the fiber(s) is/are wound closely next to and in contact with each other. The wound fibers are already impregnated with matrix material. This results in a fiber layer onto which additional fibers are wound in further fiber layers until the fiber composite material has the desired thickness and forms a corresponding fiber layer having this thickness. The outer layer is wound in several plies made of fiber composite material, where different plies may contain fibers arranged at different fiber angles with respect to the cylinder axis of the pressure vessel. In one embodiment, each of the fiber layers made of first and/or additional fibers, for instance second fibers, comprises a plurality of fiber plies. The composite gives the fiber composite material properties of higher quality, such as higher strength, than any of the two individual components involved could provide. The reinforcing effect of the fibers in the fiber direction is achieved when the modulus of elasticity of the fibers in the longitudinal direction is in excess of the modulus of elasticity of the matrix material, when the elongation at break of the matrix material is in excess of the elongation at break of the fibers and when the breaking resistance of the fibers is in excess of the breaking resistance of the matrix material. The fibers that can be used are fibers of any kind, for example glass fibers, carbon fibers, ceramic fibers, steel fibers, natural fibers, or synthetic fibers. The matrix materials used for the fiber composite layer are as a rule thermosets. The material properties of the fibers and the matrix materials are known to the person skilled in the art, with the result that the person skilled in the art can select a suitable combination of fibers and matrix materials for producing the fiber composite material for the particular application. Herein, individual fiber layers in the fiber composite region can comprise a single fiber or a plurality of equal or different fibers.

The term "thermoplast" designates plastics which can be thermoplastically deformed within a specific temperature range. This process is reversible, that is, it can be repeated for an indefinite number of times by cooling and reheating into the molten state, provided that no thermal decomposition of the material takes place due to overheating. This distinguishes thermoplasts from thermosets and elastomers. Another unique characteristic of thermoplasts is that they can be welded, in contrast to, for example, thermosets. A thermoplastic band is a planar material, preferably with a longitudinal dimension which is longer than its width.

In the pressure vessel according to the invention, thermal expansion of the inner vessel is modified by means of the thermoplastic band such that the gap between the inner vessel and the fiber reinforcement is clearly reduced or even disappears completely such that if subjected to pressure starting from an initial state of 0 bar, the first pressure impulse does not cause it to move or at least to move much less, eliminating or at least strongly reducing the risk that cracks are formed in the inner vessel. This applies in particular in case of low temperatures in which the inner vessel (liner) is brittle. To achieve this, the thermoplastic band has a thermal expansion coefficient which is lower than the thermal expansion coefficient of the inner vessel. This lower thermal expansion coefficient of the thermoplastic band can be achieved by appropriate selection of the thermoplastic material or by embedding fiber reinforcements into the thermoplastic matrix material. Thermal expansion coefficients are material parameters for thermoplastic materials. The person skilled in the art can select the appropriate thermoplastic material in accordance with the specification of the invention.

In this manner, a pressure vessel is provided which can be reliably filled multiple times even at low temperatures, particularly in a no-stress state of the vessel, without cracking.

In one embodiment, the thermoplastic band comprises a matrix material containing a material which is compatible with the inner vessel. The thermoplastic band can entirely consist of this material or be made of a matrix material in which, for instance, fiber-reinforced components can be embedded. In this manner, the thermoplastic band can be very well attached to the inner vessel, for instance by means of an appropriate welding process, since equal materials are present on both sides (band and inner vessel).

In another embodiment, the thermoplastic band is welded onto the inner vessel. A welding process establishes a secure and strong connection between the thermoplastic band and the inner vessel and is also easy to control. Thermoplasts can also be adhesively bonded; however, adhesive joints are not suited for load changes of the pressure storage at application temperatures between 110° C. and −60° C. since in this broad temperature range, the adhesive bonds are not stable enough if many load changes take place.

In a further embodiment, the thermoplastic band is additionally applied on the central portion and/or on the pole caps; preferably, it covers the inner vessel entirely. The more thermoplastic band is applied on the inner vessel, the lower the thermal expansion of the overall system will be and the better the inner vessel is protected against cracking, the effort during the manufacturing process increasing with the employed amount of thermoplastic band. If the inner vessel is completely covered with thermoplastic band, the gap between fiber composite layer and inner vessel may disappear entirely. To achieve this, the thermoplastic band can be applied on the inner vessel in several plies. Preferably, the plies are present in a number suitable to at least partially eliminate the gap between the fiber composite layer and the inner vessel. In yet another advantageous embodiment, the fiber composite layer consists of a thermosetting material.

In one embodiment, the fiber composite layer is a layer with several plies of fiber composite material, embedded in a matrix material, and the thermoplastic band is interwoven with at least one ply facing the inner vessel. Interweaving here designates the regular nesting of several strands of flexible material, in this case, the fiber composite material and the thermoplastic band. Other than, for instance, in wrapping, the individual strands are not simply placed next to or on top of one another, but cross each other, thus forming a strong and stable connection between the plies of the fiber composite layer and the plies of the thermoplastic band, so that the band is not only firmly connected to the inner vessel, but additionally to the fiber composite layer.

The invention further comprises a method of manufacturing a fiber-reinforced pressure vessel according to the invention, comprising the following steps:

- providing an inner vessel for receiving a filling medium made of a thermoplastic material, having an outer face and preferably at least one valve connection;
- applying a thermoplastic band at least on some regions of the outer face of the inner vessel, the thermoplastic band having a thermal expansion coefficient which is sufficiently small to keep any gap which may be created by thermal shrinkage between the fiber composite layer and the inner vessel due to its thermal expansion coefficient smaller than would be the case without presence of the thermoplastic band; and
- finishing the pressure vessel by applying a fiber composite layer on the outer face of the inner vessel, on which the band has been applied, to provide pressure-resistance of the pressure vessel.

With this manufacturing method, a pressure vessel is provided which can be reliably filled multiple times even at low temperatures, particularly in a no-stress state of the vessel, without cracking.

In one embodiment, application comprises the following additional steps:

- local melting of the inner vessel's thermoplastic material to create a melting zone, preferably by means of a laser beam directed at the inner vessel;
- pressing of the thermoplastic band, preferably by means of a pressure roller, onto the melting zone to create a welding connection between inner vessel and thermoplastic band, where preferably the thermoplastic band is fed to the pressure roller over a distance roller and the pressure and the distance roller track the laser beam over the outer face of the inner vessel.

With the laser beam, which is easy to guide, a melting zone with a desired extension can easily be created and controlled precisely in terms of extension and temperature. The pressure roller presses the band into the melting zone and thus ensures a good connection between the thermoplastic band and the material of the inner vessel. The welding connection created in this manner is particularly strong and reliable. The distance roller keeps the thermoplastic band away from the inner vessel where it is not yet to be connected to the vessel, and thus facilitates control of the welding process, in particular guiding of the laser beam, since the inner vessel is not unintentionally covered by the thermoplastic band which has not yet been processed.

In another embodiment, local melting and the laser beam are configured such that in addition to the material of the inner vessel, the thermoplastic band is also melted at least in the melting zone. This further improves the welding connection.

In a further embodiment, the fiber composite layer is a layer with several plies of fiber composite material, embedded in a matrix material, and the thermoplastic band is interwoven with at least one ply facing the inner vessel. This creates a strong connection between fiber composite layer and inner vessel which basically prevents a collapse of the inner vessel.

The previously listed embodiments can be used individually or in any combination to implement the devices according to the invention, in deviation from the references in the Claims.

SHORT DESCRIPTION OF FIGURES

Figure 2:
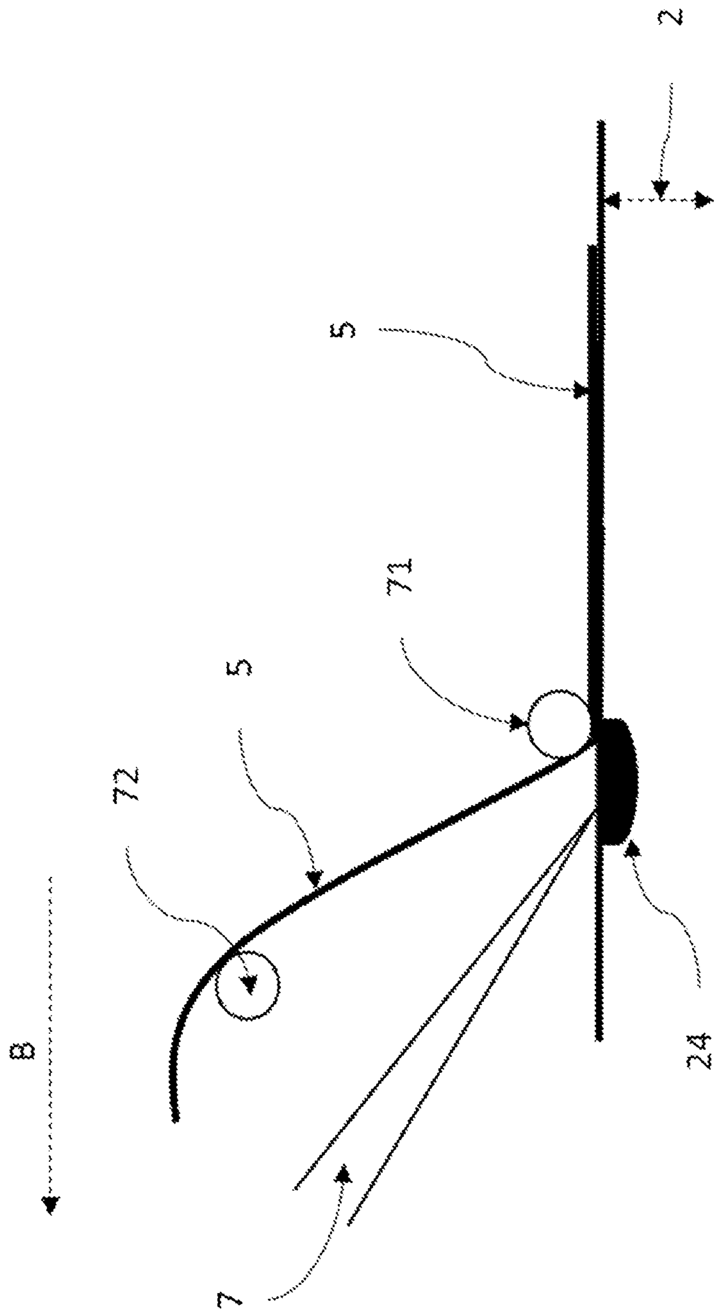
Figure 3:
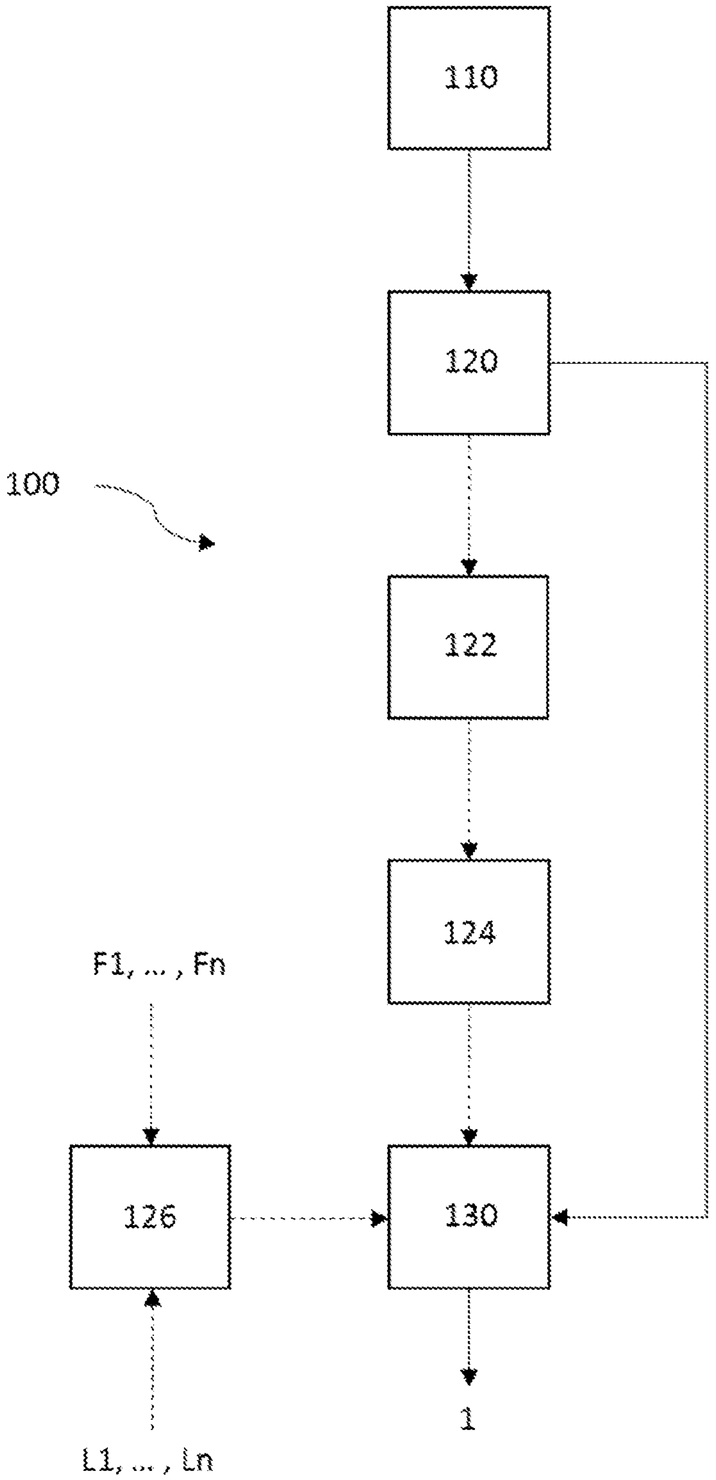

These and other aspects of the invention are shown in the figures in detail as follows:

FIG. 1: a lateral section through a (a) non-stressed pressure vessel according to the state of the art and (b) a non-stressed pressure vessel according to the present invention;

FIG. 2: an embodiment of the welding process for applying the thermoplastic band on the inner vessel and FIG. 3: an embodiment of the method according to the invention for manufacturing the fiber-reinforced pressure vessel according to the invention.

DETAILED DESCRIPTION OF EMBODIMENTS

FIG. 1 shows a lateral section through a (a) non-stressed pressure vessel 1' according to the state of the art and (b) a non-stressed pressure vessel 1 according to the present invention. In FIG. 1*a*, it can be seen that at an initial state of 0 bar, the inner vessel 2 is clearly spaced from the fiber reinforcement. If pressure is applied, this can lead to cracks in the inner vessel 2, causing the vessel to become unserviceable. The gap 6 extends between the inner vessel 2 and the fiber reinforcement through a fiber reinforcement layer 3 around the inner vessel 2 such that the inner vessel 2 here contacts the fiber composite layer 3 merely at the boss 4 and at the boss or blind boss 8 on the opposite side. This gap can have a size of, for instance, 20 mm, although during manufacturing originally the fiber composite material was directly wound about the inner vessel. The pressure vessel 1 in FIG. 1*b* according to the invention, in contrast, comprises an inner vessel 2 made of a thermoplastic material for receiving a filling medium, having an outer face and a fiber composite layer 3 arranged around the outer face for providing pressure-resistance of the pressure vessel 1 as well as a valve connection 4 connected to the inner vessel 2 and the fiber composite layer 3. On the opposite side, a boss or blind boss 8 is arranged which is connected to the fiber composite layer 3 and the inner vessel 2 as well. Other than in the state of the art, here a thermoplastic band 5 is additionally applied on some regions of the outer face of the inner vessel 2, here in the central portion of the inner vessel 2. The thermoplastic band 5 has a thermal expansion coefficient which is smaller than that of the inner vessel 2 material, so as to keep any gap 6 between fiber composite layer 3 and inner vessel 2, caused by thermal shrinkage, smaller than would be the case if no thermoplastic band 5 were present, as shown in FIG. 1*a*. It would be possible for the thermoplastic band 5 to cover the inner vessel 2 not only in the central portion but completely. The thermoplastic band 5 can be applied on the inner vessel 2 in several plies L1, . . . Ln, n preferably being a number suitable to at least partially eliminate the gap 6 between fiber composite layer 3 and inner vessel 2, which is here the case at least in the central portion. The fiber composite layer 3 can be made, for instance, of a thermosetting material. The fiber composite layer 3 can consist of several plies F1, . . . , Fn of fiber composite material, embedded in a matrix material. The thermoplastic band 5 or at least one ply of the thermoplastic band 5 can be interwoven with at least one ply F1 facing the inner vessel 2.

FIG. 2 shows an embodiment of the welding process for applying the thermoplastic band 5 on the inner vessel 2. For this purpose, the thermoplastic material of the inner vessel 2 is locally melted for creating a melting zone 24. The melting zone extends over a surface on which subsequently the thermoplastic band can be applied. The molten area affects only part of the overall thickness of the inner vessel so that melting takes place only on the surface. In this embodiment, a laser is used for creating the melting zone 24, which laser with its laser beam 7 focused on the inner vessel provides sufficient heat to melt the thermoplastic material of the inner vessel. The temperatures to be created on the inner vessel 2 result from the material properties of the thermoplastic material of the inner vessel 2 and are commonly far above 200° C. Polyethylene can be fused well at a surface temperature in the melting zone of approximately 220° C. For polyamide, temperatures of approximately 300° C. should be reached in the melting zone. The selection of the laser and optics required for this purpose lies within the skill of the person skilled in the art. To establish a good welding connection between the inner vessel 2 and the thermoplastic band 5, the thermoplastic band 5 is pressed on the melting zone 24 by a pressure roller 71, the thermoplastic band 5 being fed to the pressure roller 71 via a distance roller 72. The pressure exerted by the pressure roller 71 should be, for instance, 0.5 MPA in case of polyamide and 0.2 MPA for polyethylene. For a continuous welding process, the pressure and the distance roller 71, 72 track the laser beam 7 in the movement direction B of the welding assembly with respect to the inner vessel over the outer face of the inner vessel 2.

FIG. 3 shows an embodiment of the method 100 according to the invention for manufacturing the fiber-reinforced pressure vessel 1 according to the invention, comprising the following steps: providing 110 an inner vessel 2 for receiving a filling medium made of a thermoplastic material and having an outer face, preferably with at least one valve connection 4; applying 120 a thermoplastic band 5 at least one some portions of the outer face of the inner vessel 2, the thermoplastic band 5 having a thermal expansion coefficient which is sufficiently small to keep any gap 6 which may be produced between the fiber composite layer 3 and the inner vessel 2 due to subjection to pressure by its thermal expansion coefficient smaller than would be the case without the presence of the thermoplastic band 5; and finishing 130 the pressure vessel 1 by applying a fiber composite layer 3 on the outer face of the inner vessel 2, which is provided with the thermoplastic band 5, for providing pressure resistance of the pressure vessel 1. The application 120 can comprise the following additional steps: locally melting 122 the thermoplastic material of the inner vessel 2 to create a melting zone 24, preferably by means of a laser beam 7 directed at the inner vessel; and pressing 124 the thermoplastic band 5 on the melting zone 24, preferably by means of a pressure roller 71, to create a welding connection between the inner vessel 2 and the thermoplastic band 5, the thermoplastic band 5 being preferably fed to the pressure roller 71 via a distance roller 72 and the pressure and distance rollers 71, 72 tracking the laser beam 7 over the outer face of the inner vessel 2. Feeding of the thermoplastic band for welding can take place, for example, from a roller of thermoplastic band 5. Local melting 122 should take place and the laser beam 7 should be controlled such that in addition to the material of the inner vessel 2, the thermoplastic band 5 is also fused on at least within the melting zone 24. In one embodiment, the fiber composite layer 3 is a layer with several plies F1, . . . , Fn made of fiber composite material, embedded in a matrix material. Here, the thermoplastic band 5 consisting of one or more plies L1, . . . , Ln can be interwoven with at least one ply F1 facing the inner vessel 2.

The embodiments shown here are only examples of the present invention and are therefore not to be intended as limiting. Alternative embodiments considered by the person skilled in the art are equally comprised by the scope of protection of the invention.

LIST OF REFERENCE NUMBERS pressure vessel according to the invention
1' pressure vessel according to the state of the art inner vessel (liner) of the pressure vessel
24 melting zone
3 fiber composite layer
4 valve connection, boss
5 thermoplastic band
6 gap between fiber composite layer and inner vessel
7 laser beam
71 pressure roller
72 distance roller
8 boss or blind boss
B direction of movement of the welding assembly in relation to the inner vessel
F1-Fn plies of fiber composite material, embedded in matrix material to form the fiber composite layer
L1-Ln plies of thermoplastic band on the inner vessel
100 method of manufacturing a pressure vessel according to the invention
110 providing an inner vessel
120 applying a thermoplastic band on the outer face of the inner vessel
122 local melting of the thermoplastic material of the inner vessel
124 pressing the thermoplastic band on the melting zone
126 interweaving fiber composite material with the thermoplastic band
130 finishing the pressure vessel

The invention claimed is:

1. A fiber-reinforced pressure vessel comprising:

an inner vessel made of a thermoplastic material for receiving a filling medium, the inner vessel having an outer face and a fiber composite layer arranged around the outer face for providing pressure resistance of the pressure vessel;

at least one valve connection connected to the inner vessel and the fiber composite layer; and a thermoplastic band welded at least on a portion of the outer face of the inner vessel, wherein the thermoplastic band comprises a fiber reinforcement comprising a carbon fiber-containing fiber reinforcement, the thermoplastic band having a matrix material identical with the inner vessel, wherein the fiber composite layer is a layer with several plies of fiber composite material embedded in a thermosetting matrix, and wherein the thermoplastic band has a thermal expansion coefficient lower than that of the inner vessel and is configured to keep any gap which may be created by thermal shrinkage between the fiber composite layer and the inner vessel smaller than would be the case without the presence of the thermoplastic band, and wherein the thermoplastic band and at least an innermost ply of the several plies of the fiber composite layer facing the inner vessel cross each other and are intertwined.

2. The pressure vessel according to claim 1, wherein the thermoplastic band is additionally applied on a central portion and/or on a pole cap.

3. The pressure vessel according to claim 1, wherein the fiber composite layer consists of a thermosetting material.

4. A method of manufacturing a fiber-reinforced pressure vessel comprising:

providing an inner vessel for receiving a filling medium made of a thermoplastic material, having an outer face, with at least one valve connection;

welding a thermoplastic band at least on a portion of the outer face of the inner vessel, wherein the thermoplastic band comprises a fiber reinforcement comprising a carbon fiber containing fiber reinforcement, the thermoplastic band having a matrix material identical with the inner vessel, wherein a fiber composite layer is a layer with several plies of fiber composite material embedded in a thermosetting matrix, and the thermoplastic band has a thermal expansion coefficient lower than that of the inner vessel and is configured to keep any gap which may be created by thermal shrinkage between the fiber composite layer and the inner vessel smaller than would be the case without the presence of the thermoplastic band, and wherein the thermoplastic band and at least an innermost ply of the several plies of the fiber composite layer facing the inner vessel cross each other and are intertwined; and finishing the pressure vessel by applying a fiber composite layer on the outer face of the inner vessel provided with the thermoplastic band for providing pressure resistance of the pressure vessel.

5. The method according to claim 4, wherein applying the thermoplastic band comprises:

locally melting the thermoplastic material of the inner vessel to create a melting zone, by means of a laser beam directed at the inner vessel;

pressing the thermoplastic band, by means of a pressure roller, on the melting zone to create a welding connection between the inner vessel and the thermoplastic band, the thermoplastic band being fed to the pressure roller via a distance roller and the pressure and distance rollers tracking the laser beam over the outer face of the inner vessel.

6. The method according to claim 5, the local melting of the thermoplastic material of the inner vessel to create a melting zone being achieved by means of a laser beam directed at the inner vessel, the local melting and the laser beam being performed such or controlled such, respectively, that in addition to the material of the inner vessel, the thermoplastic band is also melted at least within the melting zone.

* * * * *